H. NELSON.
NUT LOCK.
APPLICATION FILED JULY 11, 1919.

1,324,061.

Patented Dec. 9, 1919.

Inventor
H. Nelson
By
Attorneys

UNITED STATES PATENT OFFICE.

HERMAN NELSON, OF YORK, NEBRASKA.

NUT-LOCK.

1,324,061.   Specification of Letters Patent.   Patented Dec. 9, 1919.

Application filed July 11, 1919. Serial No. 310,165.

*To all whom it may concern:*

Be it known that I, HERMAN NELSON, a citizen of the United States, residing at York, in the county of York, State of Nebraska, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks.

One object of the present invention is to provide a novel and improved construction in which the washer is held against rotation and means included for locking the nut to the washer against rotation.

Another object is to provide a novel and improved construction of this character which is capable of quick and easy application or removal, and which will effectively prevent the rotation of the nut on the bolt.

Other objects and advantages will be apparent from the following description when taken in connection with the accompanying drawing.

Figure 1:
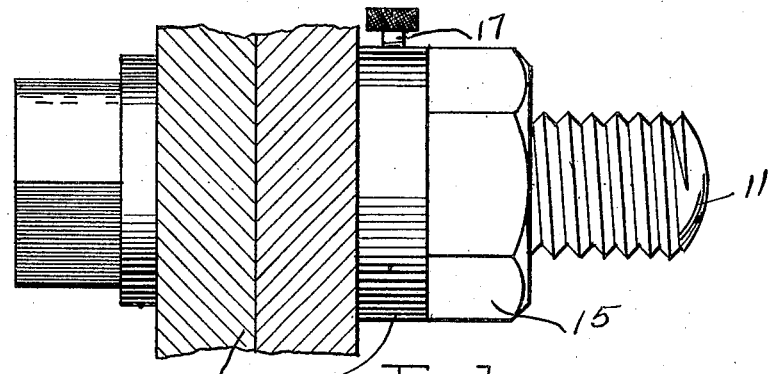
Figure 1 is an elevation of a bolt, washer, nut, and support through which the bolt is engaged, showing the construction of the invention.
Figure 2:
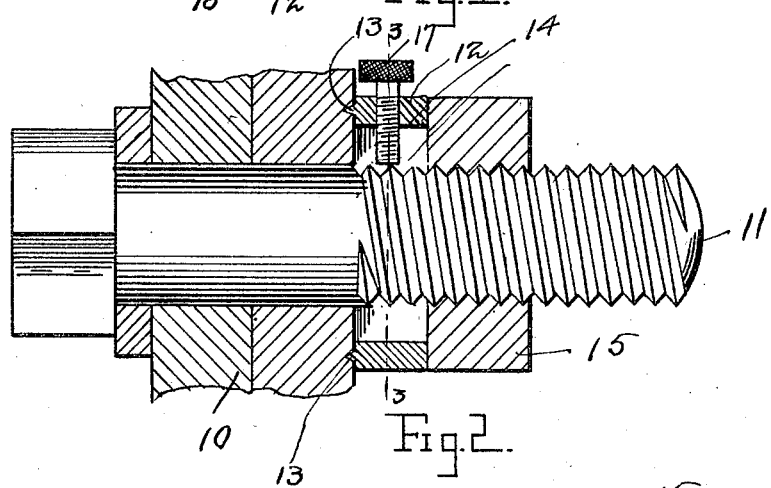
Fig. 2 is a vertical longitudinal central sectional view through the parts shown in Fig. 1, showing the manner in which the washer is held against rotation, and the manner in which the washer and nut are locked together.
Figures 3, 4:
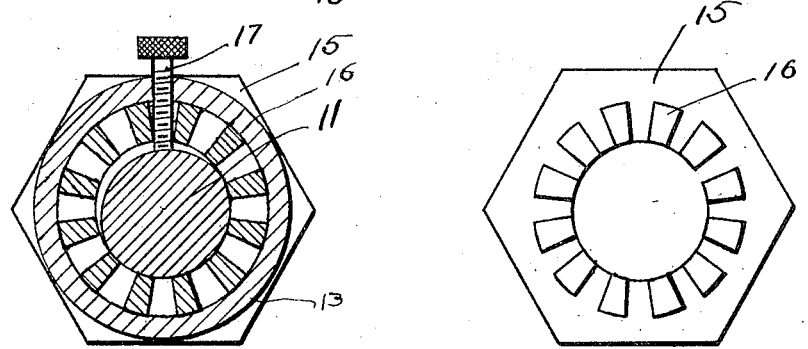
Fig. 3 is a transverse sectional view taken on the line 3—3 of Fig. 2.
Fig. 4 is an end view of the nut showing the lugs and kerfs thereof.

Referring particularly to the accompanying drawing, 10 represents a support through which is disposed the bolt 11. Engaged on the bolt, and disposed against the support, is the washer 12, the face which engages with the support being provided with pointed projections which bite into the support, as shown at 13, to hold the washer against rotation, when the nut is screwed thereagainst. The central opening 14 of the washer is preferably smooth, as shown.

Threaded on the bolt is the nut 15, the inner face of which has the longitudinally kerfed flange 16 which snugly fits into the central opening 14 of the washer, said flange being internally threaded in continuation of the threads of the bore of the body of the nut.

Threaded through one side of the washer is a screw 17 which, when the kerfed flange of the nut is properly engaged in the opening of the washer, and the projections of the washer driven into biting engagement in the support, will engage between any two adjacent portions of the kerfed flange to bind the washer and nut together and thus prevent relative rotation thereof, with respect to each other. Thus, at some point in the rotation of the nut, one or another of the kerfs will be presented in position to permit the screw to be moved therethrough and bite into the threads of the bolt.

What is claimed is:

In a nut lock, the combination with a support and bolt therethrough, of a washer on the bolt and having means for biting engagement in the support to prevent rotation of the washer, a nut threaded on the bolt and having a flange of smaller diameter than the nut and formed with longitudinal kerfs, said flange being engaged in the central opening of the washer, and a screw engaged through the washer and through a kerf into biting engagement with the threads of the bolt, whereby the washer and nut are held against rotation in either direction.

In testimony whereof I affix my signature, in the presence of two witnesses.

HERMAN NELSON.

Witnesses:
 J. I. MOORE,
 C. G. STOLL.